Aug. 13, 1957 K. HORNELAND 2,802,493
GUIDE FOR PORTABLE POWER SAWS
Filed April 19, 1955 2 Sheets-Sheet 1

INVENTOR.
KRISTIAN HORNELAND
BY
McMorrow, Berman & Davidson
ATTORNEYS

Aug. 13, 1957  K. HORNELAND  2,802,493
GUIDE FOR PORTABLE POWER SAWS
Filed April 19, 1955  2 Sheets-Sheet 2
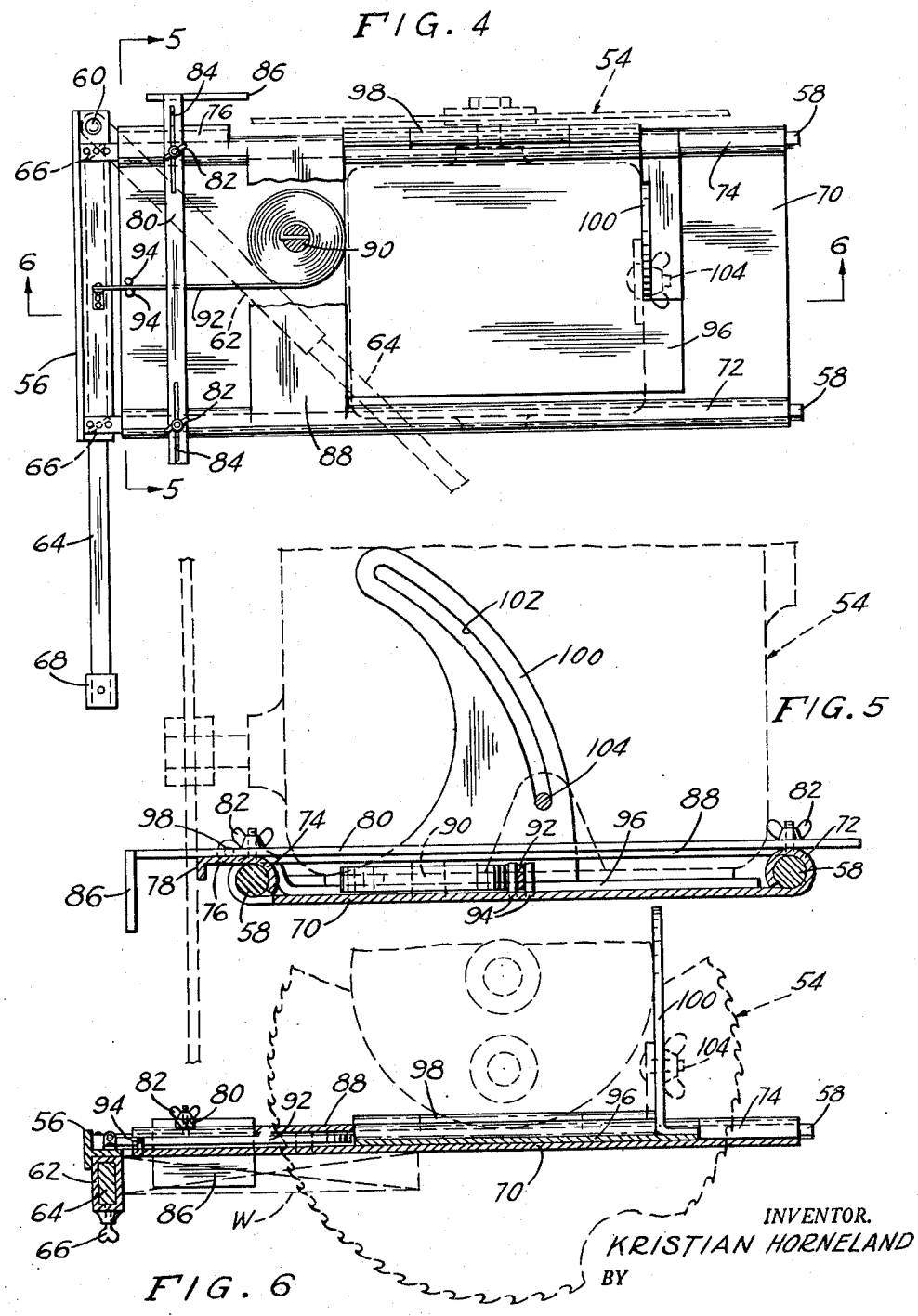
INVENTOR.
KRISTIAN HORNELAND
BY
McMorrow, Berman & Davidson
ATTORNEYS

United States Patent Office 2,802,493
Patented Aug. 13, 1957

2,802,493

GUIDE FOR PORTABLE POWER SAWS

Kristian Horneland, Fergus Falls, Minn.

Application April 19, 1955, Serial No. 502,487

2 Claims. (Cl. 143—6)

This invention relates to a guide for a portable power saw, and more particularly has reference to a guide which can be used either as an attachment for a portable power saw ready in use, or, in a second form of the invention, as a component part of the saw itself, for the purpose of insuring that the saw will be guided along a predetermined, straight line when making a cut.

Heretofore, when a saw is to make a cut across a length of wood, it has been generally customary to mark off the length, after which a square is applied to the wood at the marking for the purpose of drawing a line thereacross, along which line the saw is to be moved when traversing the work.

This is time-consuming and inconvenient, and accordingly, one important object of the present invention is to provide a generally improved guide for portable power saws, which can be used in permitting the saw to be directed along a straight, proper path at the location of the marking, without the necessity of first using a separate square or similar tool for the purpose of drawing a line across the work.

Another object of importance is to provide a guide for portable power saws which can be used not only for making cuts directly across the wood at ninety degrees to the longitudinal center line of the work, but also, miter cuts across the wood at selected angles oblique to the longitudinal center line.

Still another object of importance is to provide a guide as described which will incorporate therein not only the characteristics of a square but also the characteristics of a guide that will insure the saw being led along a straight line, while at the same time permitting the device to be manufactured at a minimum of cost.

Still another object is to provide a device as stated which will be rugged, relatively simple, will not interfere with normal operation of the saw, and will be substantially trouble free in operation.

Still another object of importance is to provide a guide device for portable power saws which, in the form in which it is an attachment to a saw already in use, can be swiftly attached to or detached from the saw, regardless of the particular length of the saw base, without the requirement of special tools and with maximum speed and ease.

Other objects will appear from the following description, the claims appended thereto, and from the annexed drawings in which like reference characters designate like parts throughout the several views and wherein:

Figure 4 is a top plan view of a modified construction;

Figure 5 is an enlarged transverse section on line 5—5 of Figure 4; and

Figure 6 is a longitudinal sectional view on line 6—6 of Figure 4.

Figure 1:
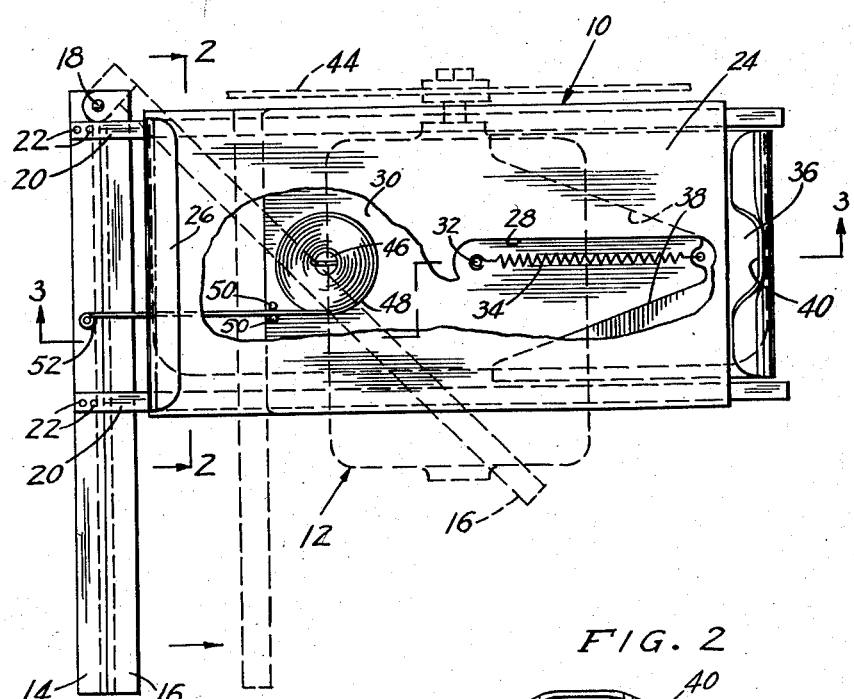
Figure 1 is a top plan view of a guide for portable power saws formed according to the present invention.

The reference numeral 10 has been applied generally to the guide device constituting the present invention, said device being illustrated in association with a conventional portable power saw generally designated 12. The guide device includes an elongated, transversely extending bar 14 of inverted L-shape in cross section, and pivotally connected by a pin 18 to said bar 14 is an elongated movable bar 16, also of inverted L-shape in cross section, although formed oppositely to the bar 14 as readily seen from Figure 3. The movable bar 16 normally extends in longitudinally contacting relationship with the bar 14, and is coextensive in length with said bar, so as to cooperate in this position of the parts with the bar 14 in defining a straight edge of T-shaped cross section, which can be engaged over one side edge of a piece of work W such as an elongated length of wood stock that is to be cut.

Alternatively, the bar 16 can be swung outwardly from the bar 14, as for example to the dotted line position shown in Figure 1, for the purpose of disposing the blade of the portable power saw 10 obliquely to the longitudinal center line of the length of wood W, when a miter cut is to be made rather than a cut straight across the wood normal to the longitudinal center line.

Figure 2:
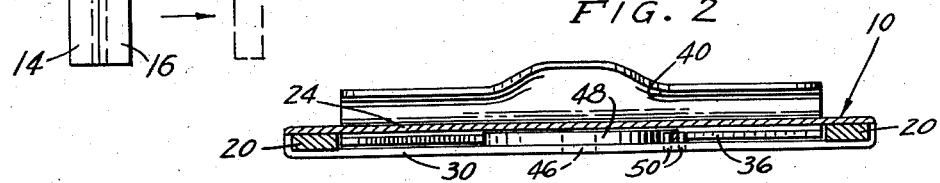
Figure 2 is an enlarged transverse section on line 2—2 of Figure 1.

A pair of elongated, straight guide rails 20 are spaced apart a substantial distance from one another along the length of the stationary bar 14, and at one end are riveted to the bar 14 as at 22, the respective guide rails extending perpendicularly to the length of the stationary bar. The guide rails 20, in the Figure 1 form of the invention, are of flat, rectangular cross section as shown in Figure 2, and underlie the opposite side edge portions of an elongated, rectangular top plate 24 one end of which is formed with a transversely extending, upwardly and inwardly turned retaining flange 26. In the forward end portion of the plate 24 there is formed a longitudinally and centrally extending closed slot 28, through which can be seen a flat, rectangular bottom plate 30 having upturned side edge portions providing guides for the guide rails 20, the plate 30 underlying the guide rails as seen in Figure 2 in closely spaced, parallel relation to the top plate 24.

Projecting upwardly from the plate 30 intermediate opposite ends thereof is a pin 32 to which is connected one end of an expansion spring 34, the other end of which is hooked to a flat plate 36 sliding in the space between the forward end portions of the top and bottom plates 24, 30 respectively.

Plate 36, at its inner end, has a wide, V-shaped notch 38, and at the inner end or apex of said notch a lug is formed, apertured to receive the adjacent end of the spring 34. The spring 34, tending to contract, normally urges the plate 36 inwardly within the space between the top and bottom plates, but the plate 36 can be pulled outwardly, to the right in Figure 1, to extend the overall length of the saw support plate assembly defined by the top and bottom plates and by the extension plate 36.

The plate 36 projects outwardly beyond the forward ends of the top and bottom plates, and is integrally formed with an upwardly and inwardly turned lip 40, the midwidth portion of which is turned upwardly to provide a handle facilitating grasping of the extension plate.

Figure 3:
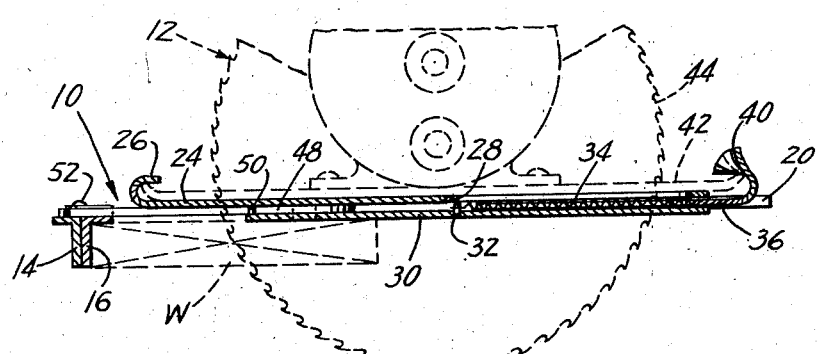
Figure 3 is a longitudinal sectional view on line 3—3 of Figure 1.

The saw 12, as usual, has the conventional bottom plate 42 having slightly upturned ends, said ends engaging under the end flanges 26, 40 respectively as shown in Figure 3. The plate 36 can be pulled outwardly as necessary to accommodate the plate assembly to the overall length of the saw base plate, and when the saw base plate is to be disengaged from the plate assembly, it is merely necessary to grasp the handle on the flange 40, and pull the extension plate 36 to the right in Figure 3 against the restraint of spring 34, to free the saw base plate from the support plate assembly of the device constituting the present invention.

When the saw is secured to the plate assembly in the manner referred to, the circular blade 44 is disposed adjacent one of the side rails 20, in position to make a cut across the work W.

Fixedly connecting the top and bottom plates in closely spaced relation is a pin 46, and said pin 46 has anchored thereto one end of a flatly coiled spring 48, the outer end of which is guided between closely spaced upstanding lugs 50 provided upon the rear end of the bottom plate 30, and is anchored to an upstanding lug 52 carried by the bar 14.

The purpose of the spring 48 is to effect a return of the plate assembly toward the bar 14, and in use of the device, when the cut is to be made, the saw is grasped and pulled to the right in Figure 1, thus shifting the plate assembly bodily to the right, said plate assembly sliding upon the rails 20. When the saw blade is now returned to the left in Figure 1 for the purpose of making the cut, the traverse of the work will be aided by the tendency of the spring 48 to contract.

It will be observed that when a cut is to be made, it is merely necessary that the work be marked at the location of the cut. Thereafter, it is not necessary to draw a line through the marking with the use of a conventional carpenter's square. Instead, the square constituted by the members 14, 16 is positioned against one longitudinal edge of the work W, and the end of the bar 14, adjacent the pin 18, will coincide with the marking, so that the blade 44, which is coplanar with the end of the bar 14, will be properly positioned for the purpose of traversing the cut at the marked location. The saw is now pulled to the right in Figure 1 against restraint of spring 48, and then is permitted to return to the left in Figure 1, for the purpose of making the cut.

Of course, it is not necessary that the end of the bar 14 be used as an index to be registered with the marking. Instead, the saw blade can be visually aligned with the marking, or any other suitable means can be incorporated in the device itself for properly locating the saw blade 44 for the purpose of making the cut without the necessity of first drawing a line across the work by the use of a conventional straight edge or carpenter's square.

In Figures 4–6, there is shown a modified form, which instead of being a separate attachment for a portable power saw is designed to be incorporated in the saw base itself. In this form of the invention, the saw has been generally designated at 54.

A transversely extending straight edge of T-shaped cross section has been designated at 56, and riveted or otherwise fixedly secured to the member 56, at locations spaced longitudinally of the member, are elongated guide rails 58 of circular cross section, extending in parallel relation, and disposed normally to the length of the straight edge member 56.

A pivot pin 60 is carried by the member 56 adjacent one end thereof, and hingedly connects to the member an elongated sleeve 62 of rectangular cross section which, in one position shown in full lines in Figure 4, is engaged against the depending longitudinal flange of the member 56 so as to cooperate therewith in providing a straight edge usable as a square when the device is to be utilized for the purpose of traversing a piece of work W. The sleeve 62 has slidably telescoped therein an expansion bar 64, capable of being clamped in selected positions of extension or retraction in respect to the sleeve by means of wing screws 66 threadably engaged in the sleeve. These screws 66 are adapted to bind against the underside of the extension bar, thus to prevent relative movement between the extension bar and the sleeve in selected positions of adjustment of the extension bar.

When the extension bar has been projected out of the sleeve to a desired extent, it can be grasped for the purpose of holding the sleeve and bar firmly against a piece of wood, and at its outer end, the extension bar has a cap 68, for the purpose of providing a spacer which will make up for the smaller cross sectional area of the extension bar 64 as compared to that of the sleeve when the device is to be used against one side of a piece of work.

A bottom plate 70 is of elongated, rectangular formation and extends in the space between the guide rails 58. The bottom plate at opposite sides thereof has elongated guide sleeves 72, 74, said sleeves being rolled out of the material of the bottom plate as shown in Figure 5 and being adapted to slidably engage the guide rails for the purpose of mounting the saw for sliding movement upon said rails.

The sleeve 74, adjacent its rear end, has a lateral extension 76 terminating in a depending lip 78 to provide a work guide, when the device is used in traversing the work during the making of a cut.

Upstanding studs are carried by the sleeves 72, 74, projecting through slots 84 formed in the opposite ends of and extending longitudinally of a cross bar 80, said cross bar 80 being clampably engaged in selected positions to which it is adjusted transversely of the plate 70 by means of wing nuts 82 threaded upon the upstanding studs. The cross bar 80, at one end thereof, has a flat plate 86 disposed in a vertical plane, to provide a guide adjustable transversely of the device for the purpose of engaging a nearby abutment or the like to insure the making of a straight cut.

Integrally formed with the sleeves 72, 74 and extending transversely of the device therebetween in spaced, parallel relation to the bottom plate is a top plate 88. The plate 88 is relatively narrow, being no greater in width than necessary to cover a flatly coiled spring anchored to a pin 90 extending between the plates 88, 70, said spring being designated at 92 and passing between upstanding guide lugs 94 and being anchored at its free end to the stationary bar member 56.

In this form of the invention, the saw can not only make simple miter cuts, but can also make compound miter cuts, with the blade being tiltable out of a vertical plane for this purpose. To this end, there is provided a saw support plate 96, hinged at 98 to one side of the plate assembly, to permit the saw to be swung upwardly and downwardly for the purpose of tiltably adjusting the saw blade, and extending upwardly from the plate assembly is a stationary clamp plate 100, having an arcuate slot 102 curving about the hinge axis of the plate 96. The saw motor would carry a screw 104 extending through the slot 102, said screw having a wing nut for the purpose of permitting the saw motor to be clampably engaged with the upstanding plate 100 in selected positions to which the saw motor and its associated plate 96 are swung upwardly or downwardly for the purpose of tiltably adjusting the saw blade.

In both forms of the invention, there is a common characteristic wherein the device in effect carries its own square, so that after a point has been marked upon a piece of wood, the device can be positioned with its stationary bar member directly against the side of the piece of wood for the purpose of properly locating the guide rails in perpendicular relation to the work. With the guide rails in this position, the saw carried upon the plate assembly can be used to traverse the work, and will make a cut at right angles to the longitudinal center line of the work.

Also, in both forms of the invention, if a miter cut is to be made, the elongated straight edge member hingedly connected to the stationary member is swung to a selected acute angle relative to the stationary member, and this will be now the member that is to be engaged with the side edge of the piece of work. As a result, the guide rails will now be positioned obliquely to the longitudinal center line of the work, for the purpose of making a miter cut at a selected angle, when the plate assembly is shifted slidably upon the guide rails in the direction of the stationary and swinging straight edge member.

Of course, the stationary and swinging straight edge members can be provided with cooperating protractor means or the like, for the purpose of insuring that the swinging straight edge member will be adjusted outwardly to the particular angle that is desired, before the cut is made.

In the second form of the invention, of course, the saw not only makes a simple miter cut, but also can be used for the purpose of making compound miter cuts, due to the provision of the upwardly swingable saw support plate element 96.

It will be understood that the straight edge member or square could be secured detachably but fixedly to the guide rails at an angle of forty-five degrees, rather than at ninety degrees. This might be preferred when an accurate forty-five degree cut is very important. Further, the detachable member might in this instance be one of a set, so that the worker can attach any desired square to the plate or base to make a cut at a corresponding angle.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A guide for portable power saws including a first straight edge member adapted to be engaged along one side of a length of wood to be cut; a second straight edge member hingedly connected to the first straight edge member and adjustable between a first position in which it is in longitudinal contact with the first member, and any one of a plurality of second positions in which it is at a selected angle to the first member, said second member being selectively engageable against a piece of work and being adapted to be held against the piece of work by a user; a pair of guide rails fixedly secured to and extending perpendicularly to the first member; a plate assembly including top and bottom plates fixedly connected together in closely spaced parallel planes and slidably supported upon said guide rails for movement along the length of the guide rails toward and away from the first and second members, said plate assembly being adapted to support a portable power saw, an extension plate telescoping in the space between the top and bottom plates, a resilient yielding connection between the bottom plate and the extension plate tending to shift the extension plate inwardly of the space between the top and bottom plates, and means on said extension plate adapted when in its inward position to engage latchingly and hold in place the portable saw when the latter is supported upon said plate assembly.

2. A guide for portable power electric saws comprising first and second members hingedly connected together by a normally vertical pivot at one end, said members being swingable between one position in which they are in longitudinal contact, and any one of a plurality of second positions in which they are at a selected angle to one another, one of said members being adapted to be engaged along one side of a piece of work; a pair of guide rails fixedly secured to and extending in perpendicular relationship to the other member, thus to dispose the guide rails at a selected angle relative to the first named member; top and bottom plates fixedly connected together in closely spaced, parallel planes and slidably mounted upon the guide rails; an extension plate telescoping in the space between the top and bottom plates, the top plate having at one end thereof an inwardly turned, upwardly projecting flange, and the extension plate having at one end thereof an opposed, upwardly turned, inwardly projecting flange, said flanges being adapted to engage opposite ends of a portable electric saw base supported upon the top plate; a resilient, yielding connection between the bottom plate and the extension plate, tending to shift the extension plate inwardly of the space between the top and bottom plates; and spring means connected between said other member and the top and bottom plates, in the space between the top and bottom plates, tending to shift the plate assembly bodily along the guide rails in the direction of said other member.

References Cited in the file of this patent

UNITED STATES PATENTS

| | | |
|---|---|---|
| 1,806,528 | Fegley et al. | May 19, 1931 |
| 2,513,497 | Laughlin | July 4, 1950 |
| 2,527,754 | McDermett | Oct. 31, 1950 |
| 2,589,554 | Killian | Mar. 18, 1952 |
| 2,620,835 | Barnhart | Dec. 9, 1952 |